United States Patent [19]
Yanagisawa

[11] Patent Number: 5,850,081
[45] Date of Patent: Dec. 15, 1998

[54] METHOD FOR GENERATING A FOCUS ERROR SIGNAL DUE TO ASTIGMATISM AND OPTICAL PICKUP DEVICE USING THE SAME

[75] Inventor: Takuma Yanagisawa, Tsurugashima, Japan

[73] Assignee: Pioneer Electronic Corporation, Tokyo, Japan

[21] Appl. No.: 904,490

[22] Filed: Aug. 1, 1997

[30] Foreign Application Priority Data

Aug. 21, 1996 [JP] Japan .................................. 8-219525

[51] Int. Cl.$^6$ ...................................................... G11B 7/00
[52] U.S. Cl. ..................................... 250/201.5; 369/44.41
[58] Field of Search .............................. 250/201.5, 201.4, 250/201.2, 214 R; 369/44.41, 44.42, 44.23, 44.25, 44.29, 44.36

[56] References Cited

U.S. PATENT DOCUMENTS

| | | | |
|---|---|---|---|
| 4,866,689 | 9/1989 | Satokata | 250/201.6 |
| 5,255,252 | 10/1993 | Katayama | 369/44.36 |
| 5,444,233 | 8/1995 | Sasaki | 250/201.5 |

*Primary Examiner*—Edward P. Westin
*Assistant Examiner*—Kevin Pyo
*Attorney, Agent, or Firm*—Perman & Green, LLP

[57] ABSTRACT

A method of generating a focus error signal in an optical pickup device including a photodetector including a light receiving surface for receiving the reflected light and divided into first to fourth quadrants defined in a tangential direction and in a radial direction from the center of the light receiving surface and at least four elements positioned in a centrally symmetric relationship with respect to the center of the light receiving surface within the first to fourth quadrants. A preliminary focus error signal is generated as an output difference between an addition output of one pair of the elements placed on centrally symmetric positions of the photodetector and an addition output of the other pair of the elements placed on centrally symmetric positions of the photodetector. A tangential push-pull signal is generated as an output difference between an addition output of one pair of the elements placed along the radial direction of the photodetector and an addition output of the other pair of the elements placed along the radial direction of the photodetector. A radial push-pull signal is generated as an output difference between an addition result of one pair of the elements placed along the tangential direction of the photodetector and an output result of the other pair of the elements placed along the tangential direction of the photodetector. The tangential push-pull signal and the radial push-pull signal is multiplied to generate a correction signal. The difference between the preliminary focus error signal and the correction signal is calculated to generate a focus error signal.

6 Claims, 6 Drawing Sheets

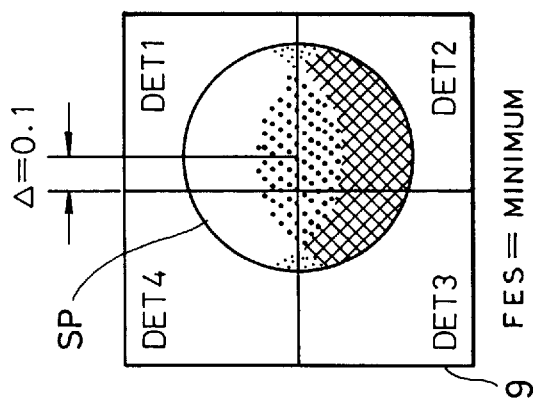
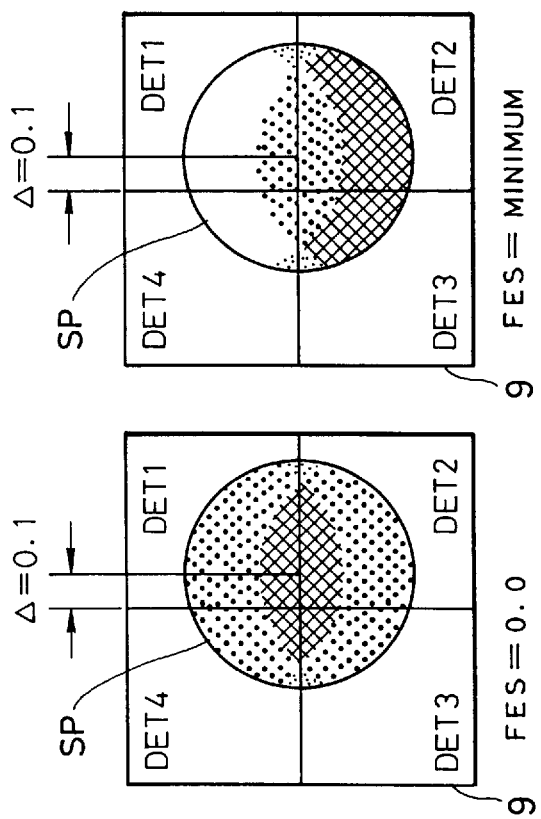
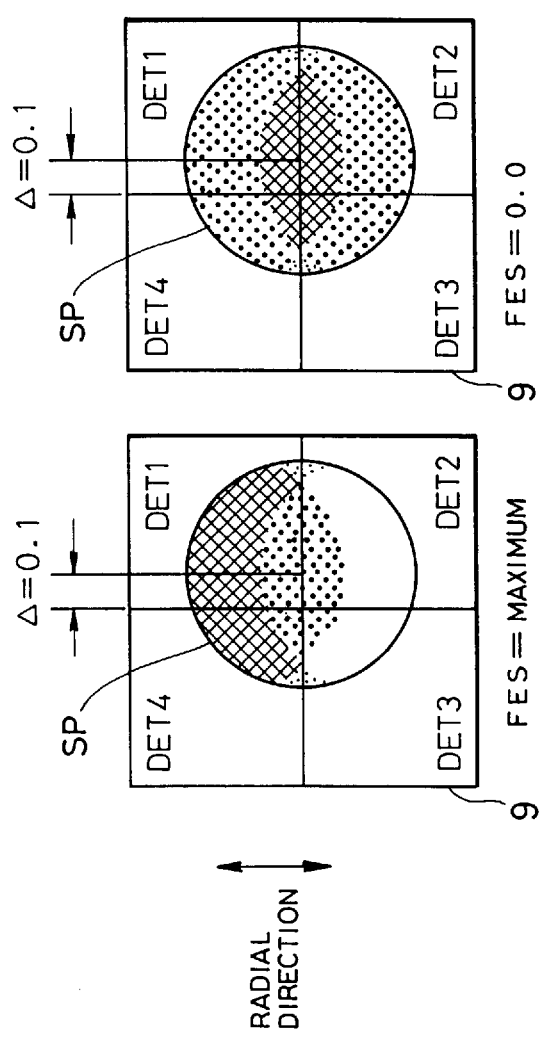

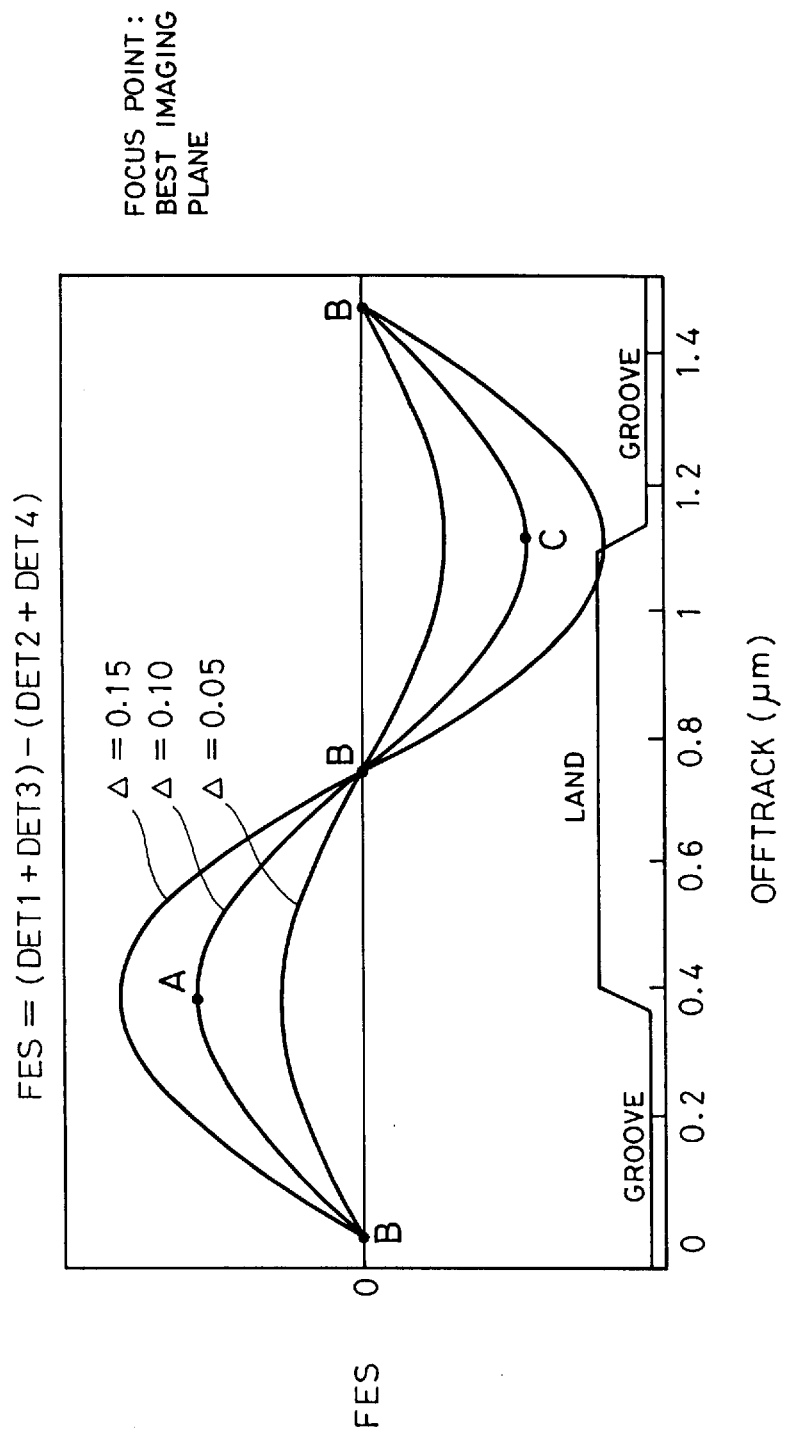

METHOD FOR GENERATING A FOCUS ERROR SIGNAL DUE TO ASTIGMATISM AND OPTICAL PICKUP DEVICE USING THE SAME

BACKGROUND OF THE INVENTION

1. Field of the Invention

The present invention relates generally to an optical pickup device for use in an optical information recording/reproducing apparatus, and more particularly, to an optical pickup including a focus error detecting circuit using an astigmatism method.

2. Description of the Related Art

For a recording/reproducing apparatus for recording/reproducing information on an optical disc, loaded therein, such as an optical video disc, a digital audio disc, and so on, a focus servo and a tracking servo are essential for always accurately converging light beams for writing and reading information to a pit train or the like formed spirally or concentrically on a recording surface of the optical disc. The focus servo performs a positional control for an objective lens, used to irradiate a pit train on the optical disc with light beams, in an optical axis direction so as to reduce a focus error, i.e., an error of the position of the objective lens in the optical axis direction with respect to the focus position of the objective lens. The tracking servo performs a positional control for the position of the objective lens, used to irradiate a pit train on the optical disc with light beams, with respect to a recording track in a radial direction of the optical disc, so as to reduce a tracking error, i.e., an error of the objective lens with respect to the pit train recording track position.

FIG. 1 illustrates a conventional optical pickup device using an astigmatism method.

A laser beam from a semiconductor laser 1 is transformed into a parallel laser beam by a collimator lens 2, passes through a polarizing beam splitter 3, and is converged by an objective lens 4 toward an optical disc 5 to form a light spot onto a pit train on an information recording surface of the optical disc 5. Light reflected from the optical disc 5 is converged by the objective lens 4 and directed by a beam splitter 3 to a detecting lens 7. Converged light formed by the detecting lens 7 passes through a cylindrical lens 8, serving as an astigmatism generating element, to form a spot near the center 'O' of a light receiving surface of a quadrant photodetector 9 having four light receiving surface areas (elements) divided by two orthogonal line segments. The cylindrical lens 8 irradiates the quadrant photodetector 9 with a light spot SP in the shape of true circle as illustrated in FIG. 2A when the laser beam is converged on the recording surface of the optical disc 5 in focus, and an elliptic light spot SP, extending in an orthogonal direction of the elements as illustrated in FIG. 2B or 2C when the converged laser beam is out of focus on the recording surface of the optical disc 5 (FIG. 2B illustrates the light spot SP when the objective lens 4 is too far from the optical disc 5, while FIG. 2C illustrates the light spot SP when the objective lens 4 is too near the optical disc 5), thus generating so-called astigmatism.

The quadrant photodetector 9 opto-electrically transduces the light spot irradiated to the four light receiving surface areas into respective electric signals which are supplied to a focus error detecting circuit 12. The focus error detecting circuit 12 generates a focus error signal (FES) based on the electric signals supplied from the quadrant photodetector 9 and supplies the focus error signal to an actuator driver circuit 13. The actuator driver circuit 13 supplies a focusing driving signal to an actuator 15. The actuator 15 moves the objective lens 4 in response to the focusing driving signal in the optical axis direction.

The focus error detecting circuit 12, as illustrated in FIG. 3, is connected to the quadrant photodetector 9, where the quadrant photodetector 9 is composed of four detecting elements DET1 to DET4 in first to fourth quadrants which are located adjacent to each other with two orthogonal division lines L1 and L2 interposed therebetween and which are independent of each other. The quadrant photodetector 9 is positioned such that the division line L2 is in parallel with a tangential direction with respect to the extending direction of the recording track, and the other division line L1 is in parallel with the radial direction of the same. Respective opto-electrically transduced outputs from the elements DET1 and DET3, symmetric with respect to the center 'O' of the light receiving surface of the quadrant photodetector 9, are added by an adder 22, while respective opto-electrically transduced outputs from the elements DET2 and DET4, also symmetric with respect to the center 'O' of the light receiving surface, are added by an adder 21, and outputs from the respective adders 21 and 22 are supplied to a differential amplifier 23. The differential amplifier 23 calculates the difference between the supplied signals, and outputs a signal indicative of the difference therebetween as a focus error signal (FES).

As described above, in the conventional focus error detecting circuit 12, the outputs of the quadrant photodetector 9 are added by the adders 21 and 22, respectively, and the differential amplifier 23 calculates the difference between the outputs of the adders 21 and 22 to generate a focus error component. In this event, when the light beam is in focus, the light spot in the shape of true circle as illustrated in FIG. 2A is formed on the quadrant photodetector 9, where a spot intensity distribution is symmetric with respect to the center 'O' of the light receiving surface of the quadrant photodetector 9, i.e., symmetric in the tangential direction and in the radial direction, so that the values resulting from the additions of the opto-electrically transduced outputs from the elements on the diagonals are equal to each other, with the focus error component being calculated to be "zero". On the other hand, when the light beam is out of focus, i.e., an elliptic light spot extending in a diagonal direction as illustrated in FIG. 2B or 2C is formed on the quadrant photodetector 9, so that the values resulting from the additions of the opto-electrically transduced outputs from the elements on the diagonals are different from each other. Thus, the focus error component output from the differential amplifier 23 exhibits a value corresponding to the focus error. Specifically, assuming that the references designated to the elements of the quadrant photodetector 9 represent the outputs thereof, the focus error signal FES is expressed by the following equation:

$$FES = (DET1 + DET3) - (DET2 + DET4)$$

However, due to an error associated with the manufacturing of the pickup, the optical axis 'X' of the spot may sometimes offset from the center 'O' of the light receiving surface in the tangential direction. If an offset Δ is present in the optical axis of the beam spot in the tangential direction, the focus error signal does include noise. This noise is hereinafter called an "FES noise".

Since conventional CD players have employed an objective lens having a small numerical aperture NA and a large focus depth, the noise more or less included in the focus error signal (FES) has not caused any problem as a focus error. However, when information is read from a recently developed optical disc having pregrooves such as DVD-RAM or the like, an objective lens having a large numerical aperture and a small focus depth is employed for purposes of reading information, so that the noise included in the focus error signal exerts larger influences on the focus servo for the objective lens.

This may cause a focus servo system to fail to follow the noise in an optical pickup device adapted to read information from an optical disc having pregrooves, resulting in oscillation of a circuit associated with the focus servo system.

SUMMARY OF THE INVENTION

The present invention has been made in view of the problem mentioned above, and its object is to provide an astigmatism focus error signal generating method and an optical pickup device which are capable of favorably eliminating, from a focus error signal, noise possibly generated when a beam spot traverses a track or a groove in an astigmatism method, in particular, noise components possibly caused by an offset of the optical axis of a beam spot in the tangential direction, i.e., an offset of the optical axis from the center of a light receiving surface of a quadrant photodetector.

The present invention provides in one aspect a method for generating a focus error signal in an optical pickup device including an astigmatism generating element for applying astigmatism to light reflected from an information recording surface of an optical disc, and a photodetector including a light receiving surface for receiving the reflected light and divided into first to fourth quadrants defined in a tangential direction and in a radial direction from the center of the light receiving surface and at least four elements positioned in a centrally symmetric relationship with respect to the center of the light receiving surface within the first to fourth quadrants. The method of the invention comprises the steps of:

generating a preliminary focus error signal calculated as an output difference between an addition output of one pair of said elements placed on centrally symmetric positions of said photodetector and an addition output of the other pair of said elements placed on centrally symmetric positions of said photodetector;

generating a tangential push-pull signal, calculated as an output difference between an addition output of one pair of said elements placed along the radial direction of said photodetector and an addition output of the other pair of said elements placed along the radial direction of said photodetector;

generating a radial push-pull signal, calculated as an output difference between an addition result of one pair of said elements placed along the tangential direction of said photodetector and an output result of the other pair of said elements placed along the tangential direction of said photodetector;

multiplying said tangential push-pull signal and said radial push-pull signal to generate a correction signal; and calculating the difference between said preliminary focus error signal and said correction signal to generate a focus error signal.

According to the astigmatism focus error signal generating method of the invention, since the correction signal can be multiplied by the predetermined coefficient, a preliminary focus error signal can be corrected in accordance with the multiplied correction signal, thereby making it possible to favorably remove, from a focus error signal, noise components due to an offset of the optical axis of a beam spot from the center of the light receiving surface of the quadrant photodetector.

In addition, in another aspect of the invention, the present invention provides an optical pickup device including an astigmatism generating element for applying astigmatism to light reflected from an information recording surface of an optical disc, which comprises:

a photodetector including a light receiving surface for receiving the reflected light and divided into first to fourth quadrants defined in a tangential direction and in a radial direction from the center of said light receiving surface, and at least four elements positioned in a centrally symmetric relationship with respect to the center of said light receiving surface within the first to fourth quadrants;

first diagonal adding means connected to first and third quadrant elements on centrally symmetric positions of said photodetector for adding outputs of said elements;

second diagonal adding means connected to second and fourth quadrant elements on centrally symmetric positions of said photodetector for adding outputs of said elements;

diagonal differential means connected to said first and second diagonal adding means for generating an output difference between outputs of said diagonal adding means as a preliminary focus error signal;

first non-diagonal adding means connected to the first and second elements along the radial direction of said photodetector for adding outputs of said elements; second non-diagonal adding means connected to the third and fourth elements along the radial direction of said photodetector for adding outputs of said elements;

first non-diagonal differential means connected to said first and second non-diagonal adding means for calculating the difference between outputs of said non-diagonal adding means;

third non-diagonal adding means connected to the second and third elements along the tangential direction of said photodetector for adding outputs of said elements;

fourth non-diagonal adding means connected to the fourth and first elements along the tangential direction of said photodetector for adding outputs of said elements;

second non-diagonal differential means connected to said third and fourth non-diagonal adding means for calculating the difference between outputs of said adding means;

multiplying means connected to said first and second non-diagonal differential means for multiplying outputs of said non-differential means to generate a correction signal; and correcting means connected to said diagonal differential means and said multiplying means for calculating the difference between said preliminary focus error signal and said correction signal to generate a focus error signal.

According to the optical pickup device of the invention, since the device may comprise constant multiplying means connected between multiplying means and correcting means for multiplying a correction signal by a predetermined coefficient. Since the correction signal can be multiplied by the predetermined coefficient, a preliminary focus error signal can be corrected in accordance with the multiplied correction signal, thereby making it possible to favorably remove, from a focus error signal, noise components due to an offset of the optical axis of a beam spot from the center of the light receiving surface of the quadrant photodetector.

BRIEF DESCRIPTION OF THE DRAWINGS

FIGS. 5A, 5B and 5C are plan views each illustrating a beam spot intensity distribution in an off track state when the optical axis of the beam spot on the light receiving surface of the photodetector is offset from the center of the light receiving surface in the tangential direction;

FIG. 6 is a graph illustrating the characteristics of FES noise versus an offset of the optical axis of a beam spot with respect to a track in a conventional optical pickup device;

DESCRIPTION OF THE PREFERRED EMBODIMENTS

The present invention will hereinafter be described in conjunction with preferred embodiments thereof with reference to the accompanying drawings.

Figure 4:
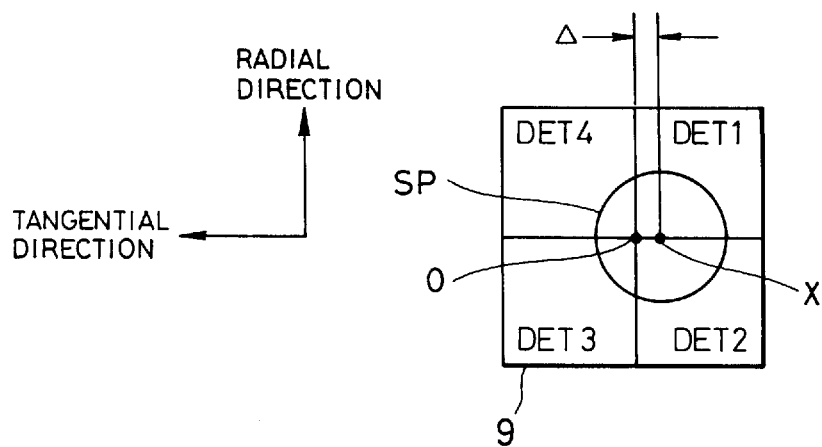
FIG. 4 is a plan view illustrating a beam spot in an off track state when the optical axis of the beam spot on the light receiving surface of the photodetector is offset from the center of the light receiving surface in the tangential direction.

The present inventors have studied the FES noise which may be multiplexed on a focus error signal in an optical pickup device which is moved in the radial direction when an offset $\Delta$ is present in the optical axis of a spot, that is, when the optical axis 'X' of the spot in the tangential direction is offset from the center 'O' of a light receiving surface of a quadrant photodetector, as illustrated in FIG. 4, on an optical disc having grooves and lands formed on an information recording surface.

Assume herein that the diameter of a spot on the quadrant photodetector illustrated in FIG. 4 is one, and an offset $\Delta$ of the optical axis, which is the distance from the center 'O' of the light receiving surface to the optical axis 'X' of the spot, normalized with the diameter of the spot, is for example 0.1. Even if the spot is focused at a groove, a light spot intensity distribution as illustrated in FIG. 5A is produced when the center of the spot, moving in the radial direction, passes near a tapered boundary of a groove and a land. From the aforementioned equation for calculating the focus error signal, FES=(DET1+DET3)−(DET2+DET4), it can be seen that the FES becomes maximum in the situation illustrated in FIG. 5A. When the spot further moves and reaches near the center of the land, a spot light intensity distribution as illustrated in FIG. 5B is produced, where the FES is zero. When the spot further moves and passes near a tapered boundary between the land and a groove, a spot light intensity distribution as illustrated in FIG. 5C is produced, where the FES becomes minimum. When the spot further moves and reaches near the center of the groove, a spot light intensity distribution is produced again as illustrated in FIG. 5B, where the FES is zero. These fluctuations in FES contribute to the generation of the FES noise.

Thus, the FES is calculated using a DVD-RAM disc as an optical disc comprising grooves and lands formed thereon. Conditions applied to the calculations are as follows:

Numerical aperture of objective lens: NA=0.60;
Wavelength of laser: $\lambda$=0.635 $\mu$m;
Track pitch: tp=1.48 $\mu$m;
Groove depth: gd=0.067 $\mu$m;
Groove width: gw=0.74 $\mu$m;
Groove taper width: gtw=0.174 $\mu$m; and
Offsets of the optical axis of a spot: $\Delta$=0.05, $\Delta$=0.10, and $\Delta$=0.015.

FIG. 6 shows the results of the calculations for deriving the FES from the aforementioned equation FES=(DET1+DET3)−(DET2+DET4) with respect to an off-track of the center of a spot from the center of a groove, when the center of a spot, focused at the best imaging point, traverses a groove and a land on an optical disc. It should be noted that no recording pits are formed in the grooves and lands on the optical disc. The configuration of a portion of the optical disc including grooves and a land is also illustrated in cross-section along the abscissa of the graph. Points A, B and C correspond to the spot light intensity distributions previously illustrated in FIGS. 5A, 5B and 5C, respectively.

It can be seen from the results shown in FIG. 6 that the FES should be essentially zero when the spot traverses the groove and the land since the spot is in focus, however, the FES is not zero but swings between a maximum value and a minimum value over tapered boundaries between grooves and lands because $\Delta$ is not equal to 0.

To cope with the inconvenience mentioned above, the present inventors have devised the following device in accordance with one embodiment of the present invention for reducing a pp (peak-to-peak) value of the FES to a value nearest possible to zero.

Figure 1:
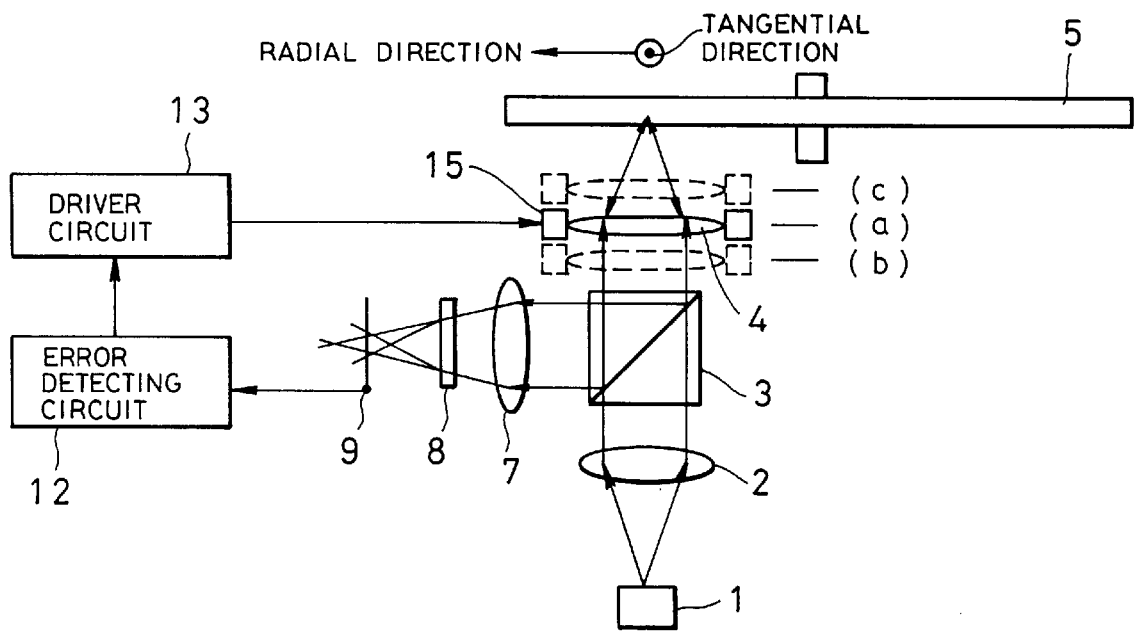
FIG. 1 is a schematic diagram illustrating the structure of an optical pickup device.
Figure 2A:
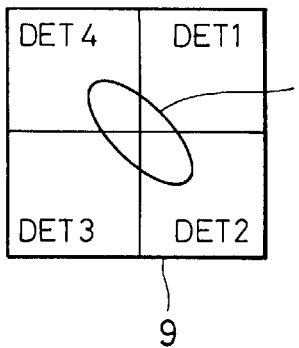
FIGS. 2A, 2B and 2C are plan views illustrating variations in shape of a beam spot on a light receiving surface of a photodetector.
Figure 2B:
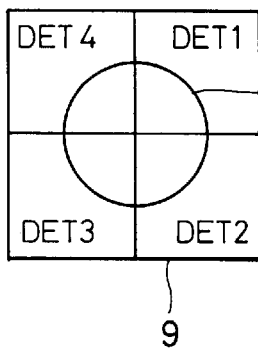
Figure 2C:
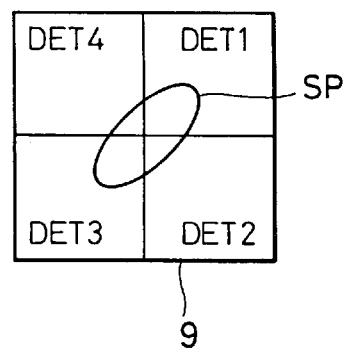
Figure 3:
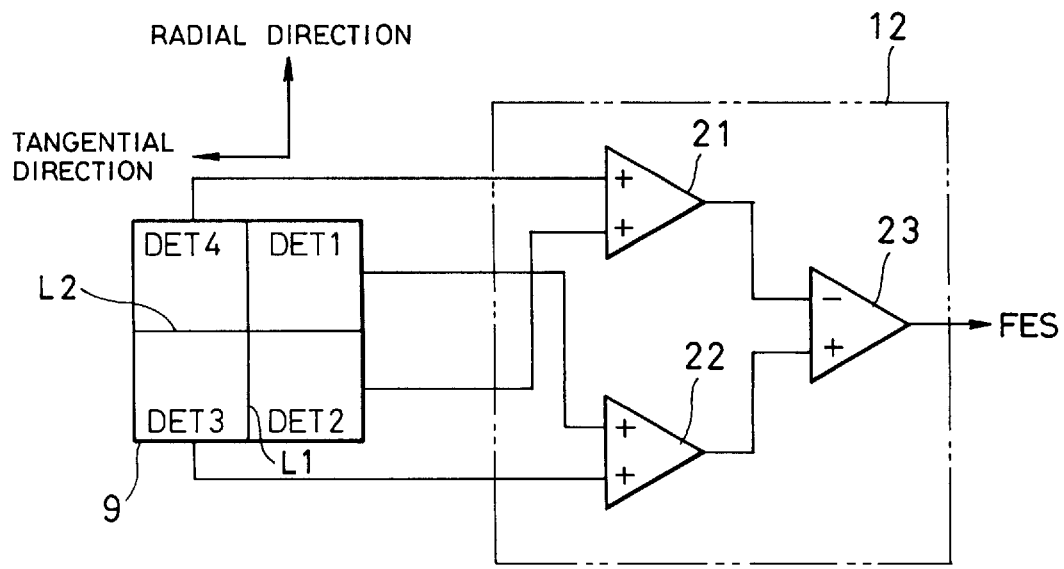
FIG. 3 is a schematic circuit diagram illustrating a focus error signal generator in a conventional optical pickup device.
Figure 7:
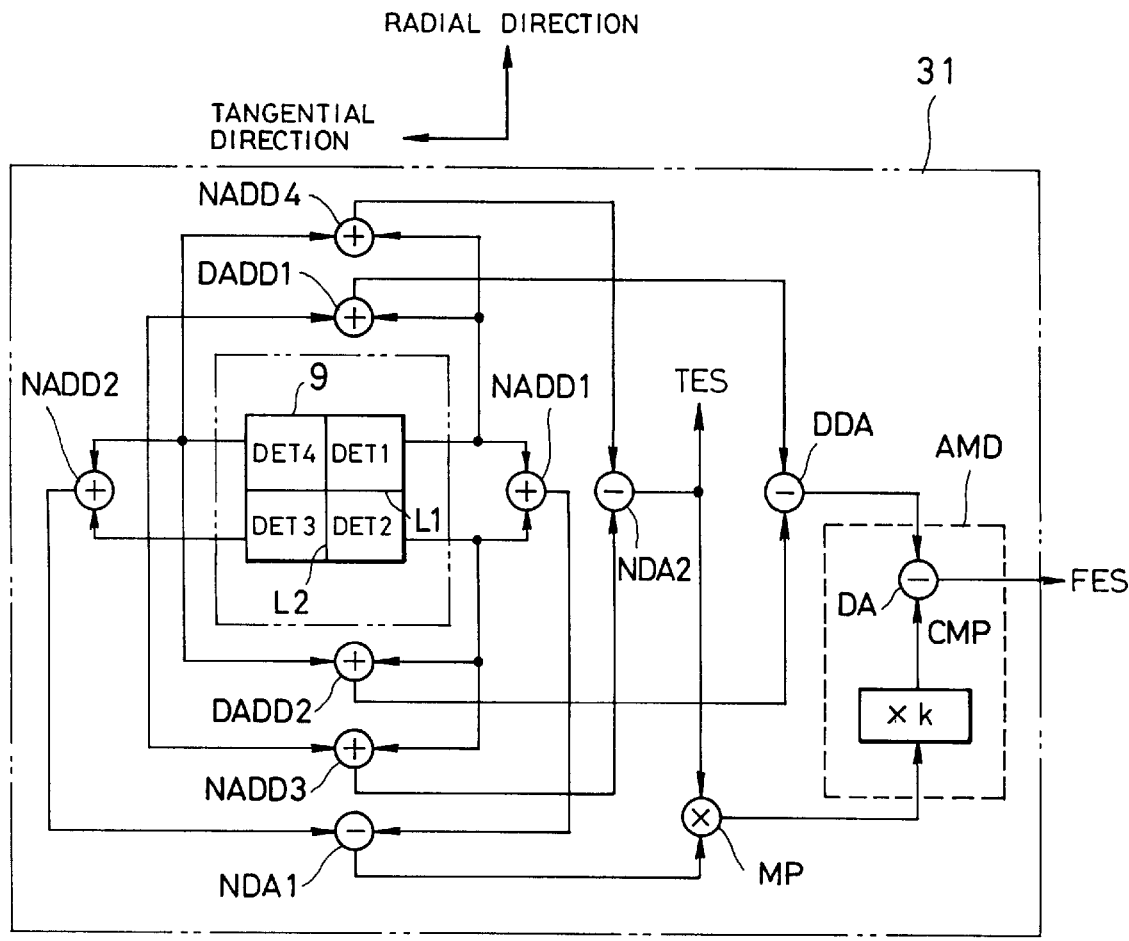
FIG. 7 is a block diagram illustrating the configuration of a focus error signal generator in an embodiment of the present invention.

Specifically, the device of the embodiment is substantially similar to the conventional optical pickup device illustrated in FIG. 1 except that the focus error detecting circuit 12 illustrated in FIG. 3 is replaced with a focus error detecting circuit 31 illustrated in FIG. 7. Thus, in the following explanation, the focus error detecting circuit 31 illustrated in FIG. 7 will be mainly discussed. A quadrant photodetector 9 is composed of four elements DET1 to DET4, corresponding to first to fourth quadrants, which are located adjacent to each other with two orthogonal division lines L1 and L2 interposed therebetween and which are independent of each other. The quadrant photodetector 9 is positioned within the optical pickup device such that the division line L1 is in parallel with a tangential direction with respect to the extending direction of the recording track, and the other division line L2 is in parallel with the radial direction of the same.

The focus error detecting circuit 31 is composed of the following components:

a first diagonal adder DADD1 connected to the first and third quadrant elements DET1 and DET3 positioned on a diagonal of the quadrant photodetector 9 for adding outputs of these elements;

a second diagonal adder DADD2 connected to the second and fourth quadrant elements DET2 and DET4positioned on the other diagonal of the quadrature photodetector 9 for adding outputs of these elements;

a diagonal differential amplifier DDA connected to the first and second diagonal adders DADD1, DADD2 for generating an output difference between outputs of the diagonal adders DADD1 and DADD2 as a preliminary focus error signal;

a first non-diagonal adder NADD1 connected to the first and second elements DET1 and DET2 positioned along the radial direction of the quadrant photodetector 9 for adding the outputs of these elements DET1and DET2;

a second non-diagonal adder NADD2 connected to the third and fourth elements DET3and DET4positioned along the tangential direction of the quadrant photodetector 9 for adding the outputs of these elements DET3and DET4;

a first non-diagonal differential amplifier NDA1 connected to the first and second non-diagonal adders NADD1, NADD2 for calculating the difference between outputs of these non-diagonal adders NADD1 and NADD2;

a third non-diagonal adder NADD3 connected to the second and third elements DET2 and DET3positioned along the tangential direction of the quadrant photodetector 9 for adding the outputs of these elements DET2, DET3;

a fourth non-diagonal adder NADD4 connected to the fourth and first elements DET4and DET1positioned along the tangential direction of the quadrant photodetector 9 for adding the outputs of these elements DET4and DET1;

a second non-diagonal differential amplifier NDA2 connected to the third and fourth non-diagonal adders NADD3, NADD4 for calculating the difference between outputs of these non-diagonal adders NADD3 and NADD4;

a multiplier MP connected to the first and second non-diagonal differential amplifiers NDA1 and NDA2 for multiplying outputs of these non-diagonal differential amplifiers NDA1 and NDA2 to generate a correction signal; and a correcting circuit AMD having a differential amplifier DA connected to the diagonal differential amplifier DDA and the multiplier MP for calculating the difference between the preliminary focus error signal and the correction signal to generate a focus error signal as a differential output.

The correcting circuit AMD is provided therein with a constant multiplier CMP connected between the multiplier MP and the differential amplifier DA for multiplying the correction signal by a predetermined coefficient "k". By adjusting the coefficient "k" to an appropriate value, it is possible to favorably remove, from the focus error signal FES, a noise component caused by an offset of the optical axis of a beam spot from the center of a light receiving surface of the quadrant photodetector 9.

Since the second non-diagonal differential amplifier NDA2 generates a radial push-pull signal which is the output difference between the respective addition outputs of the element pairs DET2, DET3and DET1, DET4placed in parallel along the radial direction, this difference signal may be utilized as a tracking error signal (TES).

The first non-diagonal differential amplifier NDA1, on the other hand, generates a tangential push-pull signal which is the output difference between the respective addition outputs of the element pairs DET1, DET2 and DET3, DET4placed in parallel along the tangential direction. This tangential push-pull signal represents an offset of the optical axis of the beam spot 'SP' from the center of the light receiving surface of the quadrant photodetector 9 in the tangential direction.

Thus, the focus error signal generating method of the present invention generates a preliminary focus error signal (the output of the diagonal differential amplifier DDA) which is the output difference between the addition result of one element pair placed on a diagonal of the quadrant photodetector and the addition output of the other element pair placed on the other diagonal, and generates a correction signal by multiplying the product of a tangential push-pull signal (the output of the first non-diagonal differential amplifier NDA1) which is the output difference between the addition outputs of one and the other element pairs not placed on the diagonals of the quadrant light element, i.e., the element pairs placed along the tangential direction and a radial push-pull signal or the tracking error signal (TES) (the output of the second non-diagonal differential amplifier NDA2) which is the output difference between the addition outputs of one and the other element pairs placed along the radial direction, by at least one of the predetermined coefficient "k". Then, the difference between the preliminary focus error signal and the correction signal is used as a focus error signal.

Assuming that the references designated to the elements of the quadrant photodetector 9 indicate their outputs, the tracking error signal TES, the tangential push-pull signal TPP, and the focus error signal FES are expressed by the following equations:

$$TES=(DET1+DET4)-(DET2+DET3)$$

$$TPP=(DET1+DET2)-(DET3+DET4)$$

$$FES=(DET1+DET3)-(DET2+DET4)-k \times TES \times TPP$$

Figure 8:
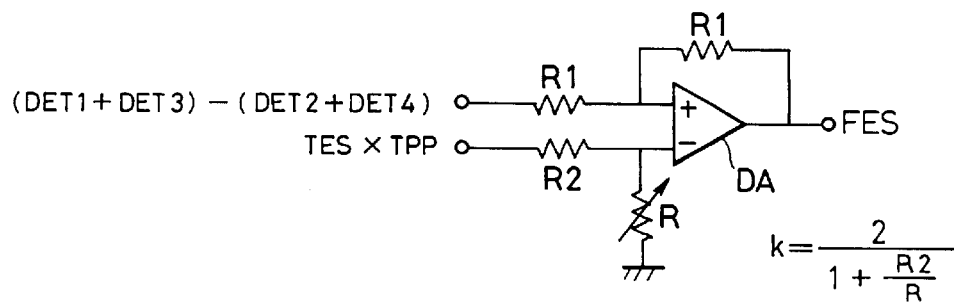
FIG. 8 is a circuit diagram illustrating a correcting circuit for the focus error signal generator in another embodiment of the present invention.

Alternatively, the correcting circuit AMD may be implemented by a circuit illustrated in FIG. 8 comprising a differential amplifier DA, resistors R1 and R2, and a variable resistor R, without using the constant multiplier CMP for the predetermined coefficient "k". Specifically, for implementing the correcting circuit AMD, the same resistor R1 is used for a resistor connected to a positive input of the differential amplifier DA associated with the output of the diagonal differential amplifier DDA and for a feedback resistor, and an intermediate point between the resistor R2 connected to the output of the multiplier MP and a negative input of the differential amplifier DA is connected to the ground through the variable resistor R.

In this way, the correcting circuit AMD generates a weighted difference signal of the two input signals from the multiplier MP and the differential amplifier DDA.

For example, during manufacturing the device, the constant "k" may be adjusted to reduce a noise level in the FES due to an offset of the optical axis of the beam spot to a minimum value by varying the value of the variable resistor R while scanning the beam spot in a direction across a track to monitor the FES.

Figure 9:
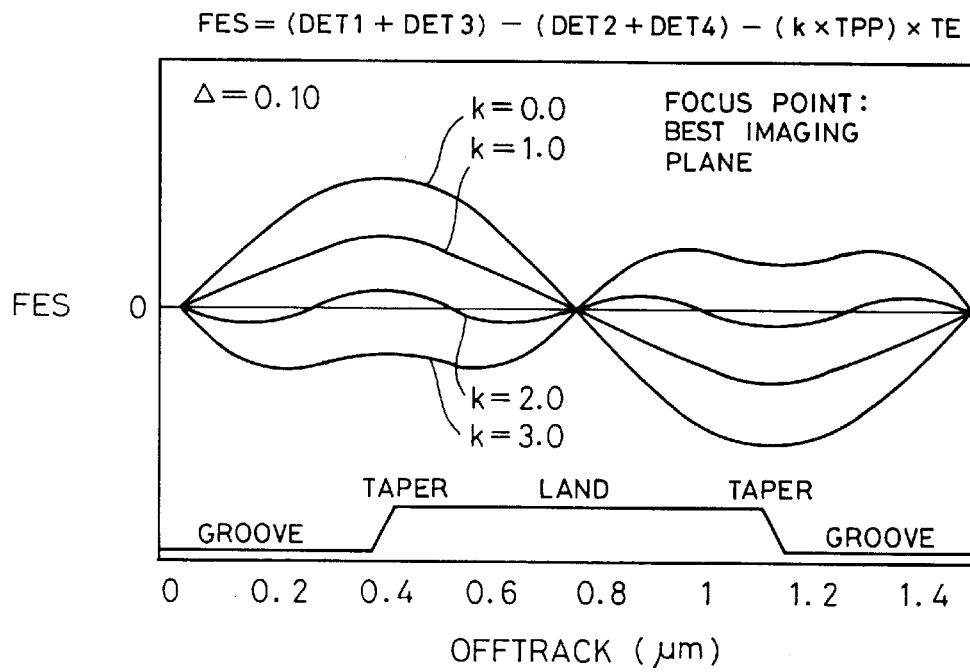
FIG. 9 is a graph illustrating the characteristics of FES noise versus an offset of the optical axis of a beam spot with respect to a track in an optical pickup device according to an embodiment of the present invention.

The present inventors have calculated the output characteristics of the device according to this embodiment in the same calculating conditions as those applied to the calculations of the track offset versus FES noise characteristics shown in the aforementioned FIG. 6. The results are shown in FIG. 9. The graph shows the results of the calculations when the constants "k" are at k=0.0, 1.0, 2.0, and 3.0 with Δ=0.10.

It can be seen from the results that the FES noise is substantially eliminated when k=2.0 even if the pp value is Δ=0.10 over a tapered boundary between a groove and a land.

Thus, the device according to this embodiment contributes to a reduction in FES noise multiplexed on the FES due to an offset of the optical axis of a spot.

It has been revealed that the adjustment of the coefficient "k", for example, in a range of zero to three (0<k<3) results in a favorable reduction in track crossing noise in a focus servo loop, although it is assumed that no recording pits are formed in grooves and lands on an optical disc. Even with an optical disc formed with recording pits, the FES noise can be reduced by appropriately selecting the coefficient "k".

While in the foregoing embodiment, the circuit is configured to implement the mathematic equation FES=(DET1+DET3)−(DET2+DET4)−k×TES×TPP, the error detecting circuit in another embodiment may be configured on the basis of the following alternative equation:

FES=(DET1+DET3)−(DET2+DET4)−k×[(DET12+DET32)(DET2+DET42)]

More specifically, the correcting term "k×TES×TPP" may be expanded as follows:

TES×TPP=[(DET12+DET32)−(DET22+DET42) ]−2×[(DET1+DET3)−(DET2+DET4)]

Evaluation of the influences of the first and second terms of the equation expressing the correcting term on the FES noise shows that the first term "[(DET12+DET32)−(DET22+DET42)]" exerts significant influences on the FES noise, so that the first term may be used in place of "TES×TPP". Therefore, the alternative equation may be used to implement the focus error detecting circuit.

Figure 10:
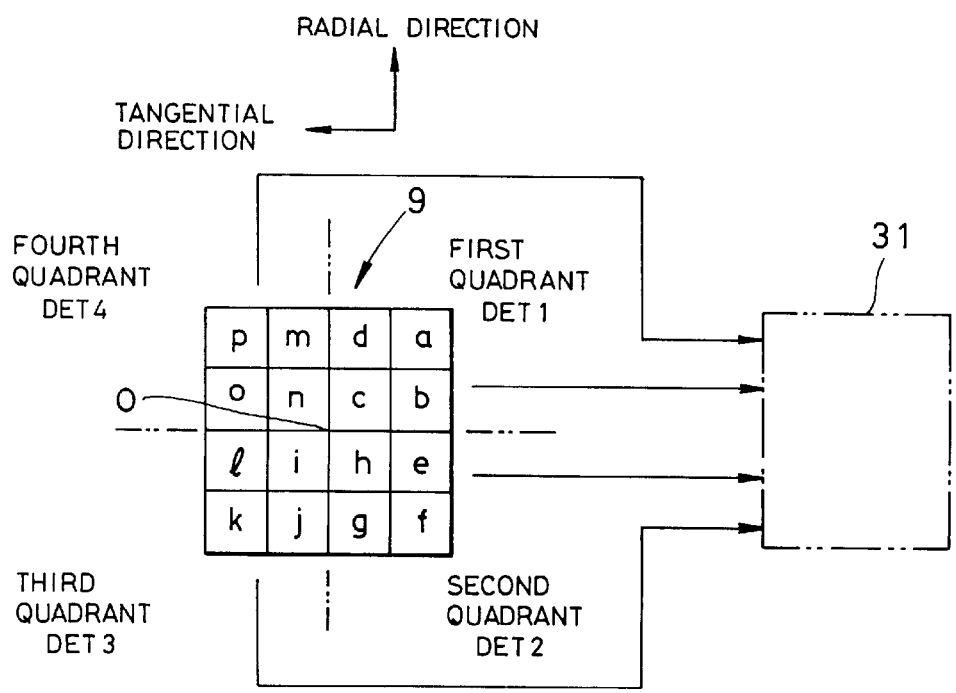
FIG. 10 is a plan view illustrating a light receiving surface of a photodetector in an optical pickup device according to another embodiment of the present invention.

Also, the device of the foregoing embodiment has been described as an optical pickup having an astigmatism generating element for applying astigmatism to light reflected from an information recording surface of an optical disc and a quadrant photodetector including a light receiving surface for receiving the reflected light, which is divided into four, i.e., first to fourth quadrant elements by two orthogonal lines passing the center of the light receiving surface. In another embodiment, any other photodetector than the quadrant photodetector may be used. For example, as illustrated in FIG. 10, a photodetector 9 may be divided into 16 elements 'a' to 'p' which are centrally symmetric with respect to the center 'O' of a light receiving surface of the photodetector 9. It is apparent in this case that a focus error signal based on astigmatism can be generated in a manner similar to the foregoing embodiment by using total outputs of four blocks each composed of four elements 'a' to 'd', 'e' to 'h', 'i' to '1' and 'm' to 'p' constituting first to fourth quadrants defined in the tangential direction and the radial direction or using outputs of elements 'c', 'h', 'i', 'n' within the 16 elements in accordance with the size of a light spot introduced to the center 'O' of the light receiving surface or the like, with the respective blocks or elements corresponded to the "DET1–DET4" outputs of the equation for calculating the FES.

Further, while the pickup device of the foregoing embodiment has employed the cylindrical lens 8 as an astigmatism generating element as illustrated in FIG. 1, a holographic element having annular fringes, a parallel transparent flat plate, or the like may be used in place of the cylindrical lens.

In addition, a light detecting element equally divided into eight areas radially from the center of a light receiving surface may be used in place of the diced photodetector divided into 16 elements to generate a focus error signal based on astigmatism, in a manner similar to the foregoing embodiment, by corresponding appropriately combined elements to the "DET1–DET4" outputs in the equation for calculating the FES.

What is claimed is:

1. A method for generating a focus error signal in an optical pickup device including an astigmatism generating element for applying astigmatism to light reflected from an information recording surface of an optical disc, and a photodetector including a light receiving surface for receiving the reflected light and divided into first to fourth quadrants defined in a tangential direction and in a radial direction from the center of said light receiving surface and at least four elements positioned in a centrally symmetric relationship with respect to the center of said light receiving surface within the first to fourth quadrants, said method comprising the steps of:

generating a preliminary focus error signal calculated as an output difference between an addition output of one pair of said elements placed on centrally symmetric positions of said photodetector and an addition output of the other pair of said elements placed on centrally symmetric positions of said photodetector;

generating a tangential push-pull signal, calculated as an output difference between an addition output of one pair of said elements placed along the radial direction of said photodetector and an addition output of the other pair of said elements placed along the radial direction of said photodetector;

generating a radial push-pull signal, calculated as an output difference between an addition result of one pair of said elements placed along the tangential direction of said photodetector and an output result of the other pair of said elements placed along the tangential direction of said photodetector;

multiplying said tangential push-pull signal and said radial push-pull signal to generate a correction signal; and calculating the difference between said preliminary focus error signal and said correction signal to generate a focus error signal.

2. An astigmatism focus error signal generating method according to claim 1, wherein said correction signal is multiplied by a predetermined coefficient.

3. An optical pickup device including an astigmatism generating element for applying astigmatism to light reflected from an information recording surface of an optical disc, comprising:

a photodetector including a light receiving surface for receiving the reflected light and divided into first to fourth quadrants defined in a tangential direction and in a radial direction from the center of said light receiving surface, and at least four elements positioned in a centrally symmetric relationship with respect to the center of said light receiving surface within the first to fourth quadrants;

first diagonal adding means connected to first and third quadrant elements on centrally symmetric positions of said photodetector for adding outputs of said elements;

second diagonal adding means connected to second and fourth quadrant elements on centrally symmetric positions of said photodetector for adding outputs of said elements;

diagonal differential means connected to said first and second diagonal adding means for generating an output difference between outputs of said diagonal adding means as a preliminary focus error signal;

first non-diagonal adding means connected to the first and second elements along the radial direction of said photodetector for adding outputs of said elements;

second non-diagonal adding means connected to the third and fourth elements along the radial direction of said photodetector for adding outputs of said elements;

first non-diagonal differential means connected to said first and second non-diagonal adding means for calculating the difference between outputs of said non-diagonal adding means; third non-diagonal adding means connected to the second and third elements along the tangential direction of said photodetector for adding outputs of said elements;

fourth non-diagonal adding means connected to the fourth and first elements along the tangential direction of said photodetector for adding outputs of said elements;

second non-diagonal differential means connected to said third and fourth non-diagonal adding means for calculating the difference between outputs of said adding means;

multiplying means connected to said first and second non-diagonal differential means for multiplying outputs of said non-differential means to generate a correction signal; and correcting means connected to said diagonal differential means and said multiplying means for calculating the difference between said preliminary focus error signal and said correction signal to generate a focus error signal.

4. An optical pickup device according to claim 3, further comprising constant multiplying means disposed between said multiplying means and said correcting means for multiplying said correction signal by a predetermined coefficient.

5. An optical pickup device according to claim 4, wherein said constant multiplying means includes adjusting means for adjusting said predetermined coefficient.

6. An optical pickup device according to claim 3, wherein said astigmatism generating means is a cylindrical lens, a holographic element, or a parallel transparent flat plate.

* * * * *